United States Patent [19]
Keim et al.

[11] Patent Number: 5,831,365
[45] Date of Patent: Nov. 3, 1998

[54] DETACHABLE MAGNET CARRIER FOR PERMANENT MAGNET MOTOR

[75] Inventors: Thomas A. Keim, Boxborough; Peter P. Mongeau, Westboro, both of Mass.; Thomas Dade, Poquoson, Va.

[73] Assignee: Kaman Electromagnetics Corporation, Hudson, Mass.

[21] Appl. No.: 888,369

[22] Filed: Jul. 3, 1997

Related U.S. Application Data

[62] Division of Ser. No. 496,928, Jun. 30, 1995, Pat. No. 5,691,589.

[51] Int. Cl.$^6$ .................................................. H02K 21/12
[52] U.S. Cl. .............................. 310/156; 310/52; 310/53; 310/152; 310/153; 29/596; 29/598
[58] Field of Search .................................. 310/52, 53, 152, 310/153, 156; 29/596, 598

[56] References Cited

U.S. PATENT DOCUMENTS

| | | |
|---|---|---|
| 4,012,651 | 3/1977 | Burson . |
| 4,085,343 | 4/1978 | Hasegawa et al. ..................... 310/52 |
| 4,227,105 | 10/1980 | Kumakura ............................. 310/153 |
| 4,472,650 | 9/1984 | Advolotkin et al. ................... 310/156 |
| 4,508,998 | 4/1985 | Hahn ..................................... 318/138 |
| 4,608,752 | 9/1986 | Muller . |
| 4,724,348 | 2/1988 | Stokes . |
| 4,792,712 | 12/1988 | Stokes . |
| 4,864,175 | 9/1989 | Rossi ..................................... 310/156 |
| 4,980,592 | 12/1990 | Olmr et al. ............................ 310/153 |
| 5,298,827 | 3/1994 | Sugiyama .............................. 310/156 |
| 5,323,078 | 6/1994 | Garcia ................................... 310/156 |
| 5,397,951 | 3/1995 | Uchida et al. ......................... 310/156 |

FOREIGN PATENT DOCUMENTS

| | | |
|---|---|---|
| 0 269 216 | 6/1988 | European Pat. Off. ......... H02K 1/18 |
| 50-127489 | 4/1977 | Japan . |
| 52-53204 | 4/1977 | Japan ............................. H02K 21/22 |
| 54-20312 | 2/1979 | Japan . |
| 611715 | 11/1948 | United Kingdom . |

OTHER PUBLICATIONS

Disclosure re "A Method of Placing and Positioning High Strength Magnets to a Rotor", Research Disclosure, No. 337, May 1, 1992.

Primary Examiner—Steven L. Stephan
Assistant Examiner—Elvin G. Enad
Attorney, Agent, or Firm—McCormick, Paulding & Huber

[57] ABSTRACT

A magnet carrier assembly for holding and carrying a high-energy-product permanent magnet is arranged for releasable attachment to a rotor of an axial disc or drum type rotor in an electric machine. The permanent magnet placed in a container which then receives a cover. The magnet carrier assembly includes a mounting flange at one end and a locating and mounting tab at an opposite end for attaching the assembly to the rotor. In certain applications, the rotor has recesses which have a size and shape complementary to the size and shape of the magnet carrier assembly. The recesses are circumaxially located around the radial periphery of the rotor at the poles of the rotor. In other embodiments, the magnet carrier assembly includes a key which is received in a mating groove in a rotor surface and is used to transfer to the rotor the electromagnetic shear force developed by the high-energy-product permanent magnet. The present magnet carrier assembly can be used with both axial field disc or radial field drum rotors. The present invention also contemplates a method and apparatus for removing and installing magnet carrier assemblies in electric machines.

4 Claims, 15 Drawing Sheets

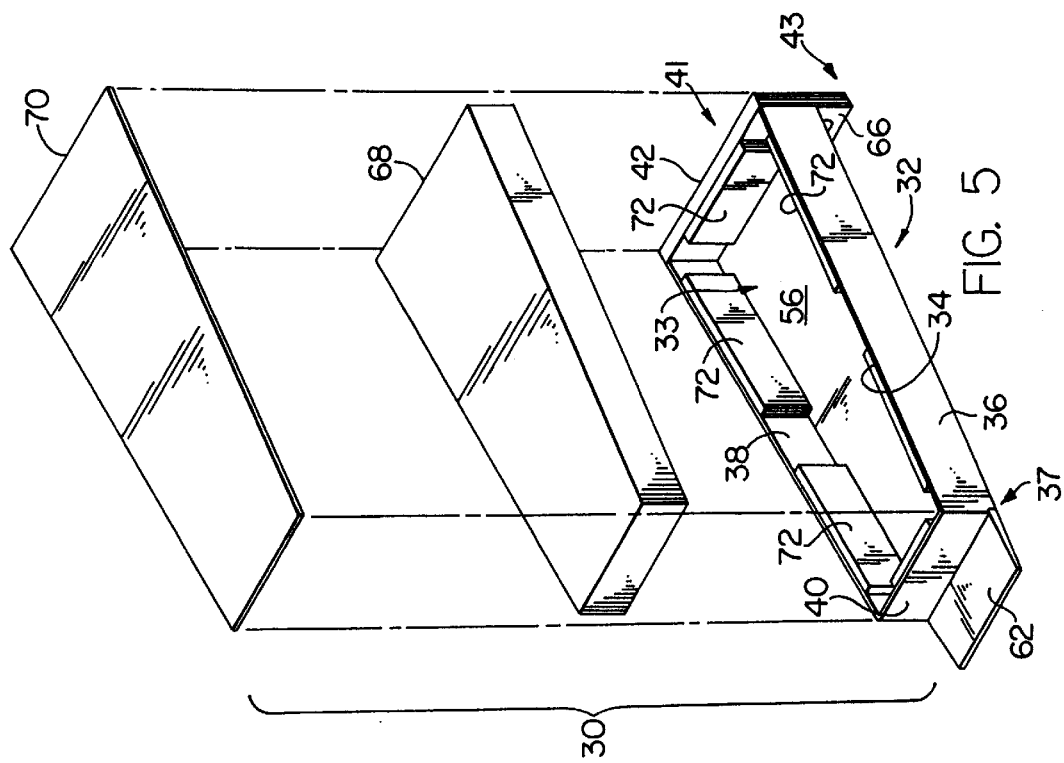
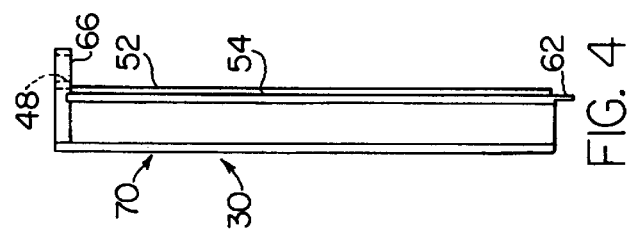
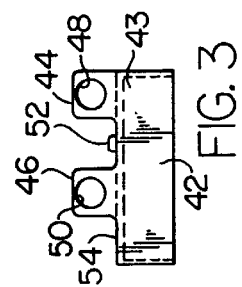

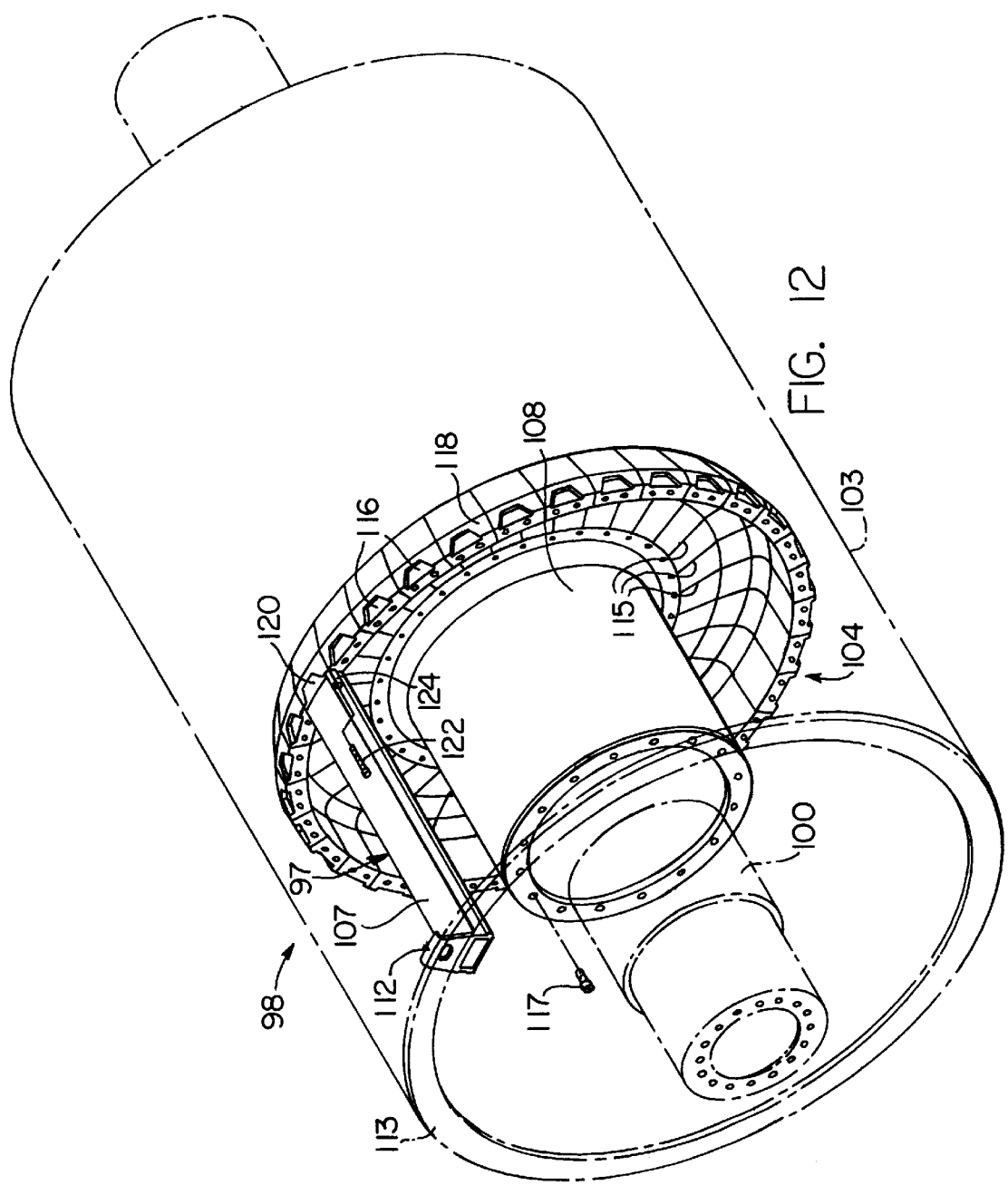

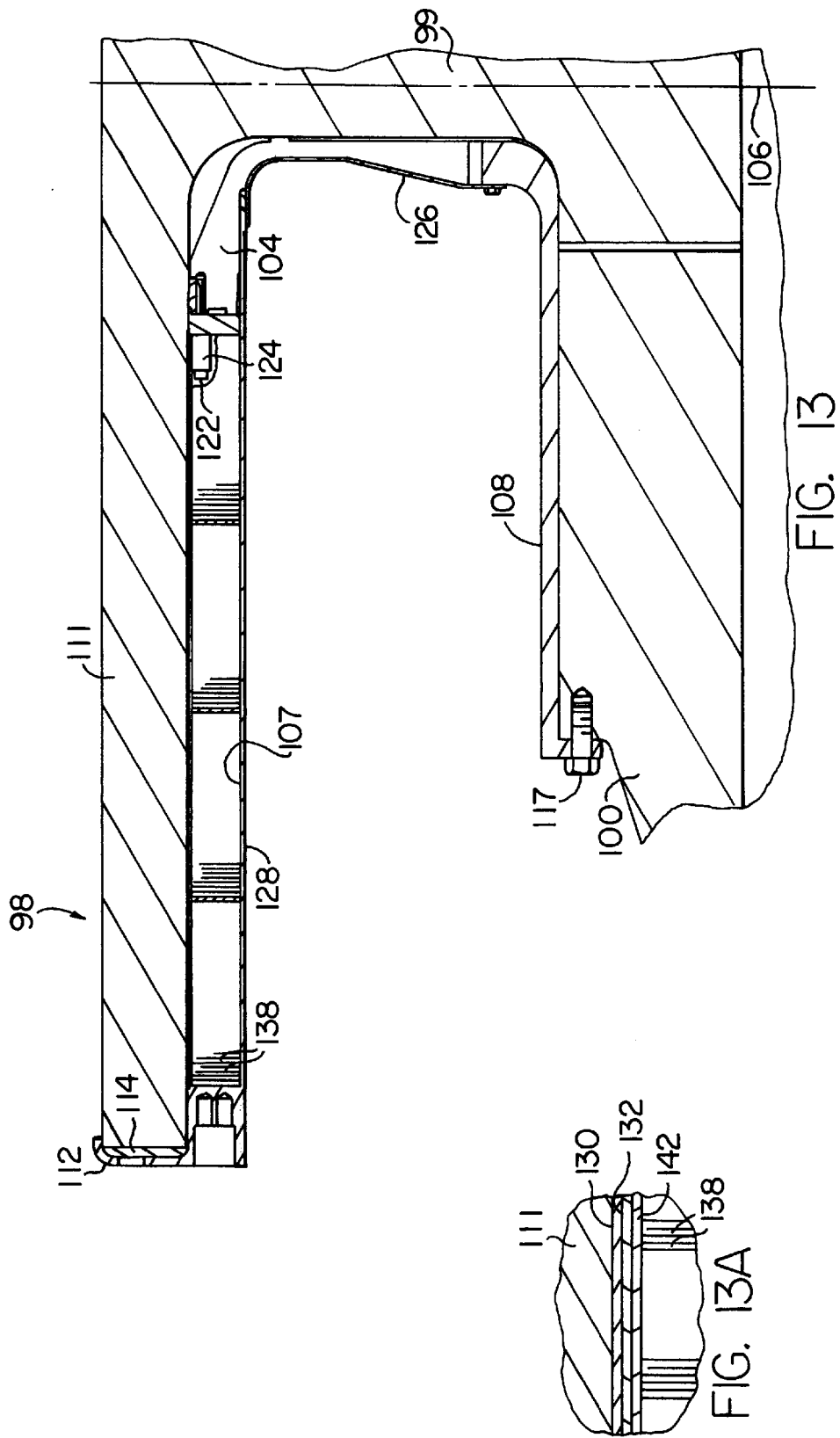

5,831,365

DETACHABLE MAGNET CARRIER FOR PERMANENT MAGNET MOTOR

This is a divisional of application Ser. No. 08/496,928 filed on Jun. 30, 1995, now U.S. Pat. No. 5,691,589.

BACKGROUND OF THE INVENTION

The present invention relates generally to high horsepower electric machines and deals more specifically with a magnet carrier assembly particularly suited for holding and carrying a high-energy-product permanent magnet. The magnet carrier assembly is releasably attached to a rotor in the high horsepower electric machine.

The advent of high-energy-product permanent magnets now makes possible the design and construction of previously unattainable high horsepower, high-performance electric machines. Construction of these high-performance electric machines presents an unusual set of design problems and considerations that must be overcome to make these high-performance electric machines practical from both a manufacturing and labor standpoint and an economic standpoint.

The material of these high-energy-product permanent magnets is extremely brittle and therefore easily susceptible to damage and breakage during handling and assembly of the electric machine. The brittle nature of the magnetic material generally precludes alteration or modification. Consequently, it is for all practical purposes impossible to drill through the material to attach screws or other mounting aids without damaging or breaking the magnet. Therefore, mounting and attachment methods are limited.

Furthermore, the high attractive force developed between the high-energy-product permanent magnet and the ferromagnetic materials in an electric machine make it extremely difficult and oftentimes dangerous for personnel to assemble the electric machine. The installation of a high-energy-product permanent magnet into the magnetic structure of an electric motor is at best a difficult process. The magnetic attractive forces of the high-energy-product permanent magnet are many times the weight of the magnet and exhibit a negative slope force gradient over distance characteristic. That is, the consequence of an increment of travel in the direction of the force is a still greater force. As a general rule, a human does not possess the muscle strength or the reaction time to deal with unpredictable and forceful movements of the magnets during handling. As a result, manual installation of a high-energy-product permanent magnet is often unsuccessful with the high-energy-product permanent magnet frequently following an unintended path often impacting the ferromagnetic part to which it is attracted wherein the force of the impact often chips or breaks the brittle magnetic material.

Additionally, and more importantly, a person caught in the travel path of a relatively large high-energy-product permanent magnet having uncontrolled movement is likely to be injured due to the high magnetic forces developed between the magnet and the ferromagnetic object to which it is attracted. A large magnet is considered to be one which is generally larger than the size of a quarter but smaller than the weight that can be safely lifted by a human in the absence of ferromagnetic material.

The above problems in handling a high-energy-product permanent magnet apply not only to the assembly of a permanent magnet into a structure used in an electric machine, but also to the assembly of the completed rotor structure into the electric machine. Elaborate tools have been devised to handle the high-energy-product permanent magnets from the time of unpacking to the time that a completed structure, for example a permanent magnet rotor assembly, is installed in the electric machine. Although acceptable results are attainable using the elaborate tooling for handling a high-energy-product permanent magnet, the associated expense and effort is not cost effective for the result obtained.

Permanent magnets are subject to both reversible and irreversible demagnetization. The reversible component of demagnetization increases with increasing temperature, but the magnetization is naturally recovered when the magnet is returned to its normal operating temperature. If the magnet is heated above its Curie temperature, however, a portion of its magnetization is lost and is not recovered upon cooling to normal operating temperature.

In order to prevent both reversible and the irreversible demagnetization, the magnet heat input, heat capacity, and heat removal are designed into the machine by various means. The heat generated harmonic, subharmonic, and asynchronous magnetically induced electrical eddy currents is limited by electrical subdivision of the magnets and/or by providing eddy current shields to exclude a significant portion of the varying magnetic fields. Irreversible demagnetization is prevented by providing adequate cooling to prevent the magnets from reaching the Curie temperature.

In high speed machines, the deliverable power depends directly on the rotor mechanical stress state at the maximum speed. In order to minimize the rotor stress, it is necessary to minimize rotor stress concentrations. The present invention directed towards magnet retention for high speed drum machines eliminates all significant rotor stress concentration associated with attachment of the magnets to the rotor. Elimination of holes in the drum rim results directly in an approximately 70% improvement achievable power density for any chosen rotor material in high speed machines which are rotor stress limited.

It is desirable therefore to overcome generally the above described problems by providing apparatus for facilitating the handling and assembly of high-energy-product permanent magnets into an electric machine.

SUMMARY OF THE INVENTION

An object of the invention is therefore to provide a magnet carrier assembly for holding and carrying a high-energy-product permanent magnet.

A further object of the present invention to provide a magnet carrier assembly which may be releasably attached to the rotor of an electric machine so that an individual high-energy-product permanent magnet may be easily installed or removed for repair or replacement and reattached.

It is a further object of the present invention to provide a magnet carrier assembly which can be used in axial gap magnetic field (disc-rotor) or substantially radial field (drum-rotor) types of electrical machines.

Still another object of the invention to assist in maintenance of the temperature of the permanent magnets below the temperature which causes a significant permanent loss of their magnetic energy product.

It is a further object of the invention to maintain the position of the magnets relative to the rotor.

Yet another object of the invention to prevent fracture of the magnets due to operational or environmental forces.

It is a further object of the invention to minimize significant rotor stress concentrations for high speed cup or drum rotor machines.

In accordance with the present invention, a magnet carrier assembly for holding and carrying a high-energy-product permanent magnet for releasable attachment to a rotor in an axial field disc or radial field drum electric machine is presented. In one aspect of the invention, the magnet carrier assembly is sized and shaped to fit recesses formed in the radial plane of an axial field disc-rotor. The magnet carrier assembly includes a wedge or trapezoidal shaped container having a base and four side walls extending generally upwardly from the base during magnet assembly. A top cover is added, creating an enclosed volume containing the magnet. The magnet carrier assembly has features which allow its position, relative to the rotor, to be fixed by screws, keys, pins, or other positive location mechanisms. The four magnet carrier container sides are preferably made of non-ferromagnetic materials. The container base and cover penetrated by the magnetic flux may be ferromagnetic or non-ferromagnetic, depending on the overall magnetic design.

In another embodiment of the present invention, a magnetic carrier assembly similar to the foregoing further includes apparatus on the sides of the carrier penetrated by the principal flux for augmentation of heat transfer. The surfaces penetrated by the magnetic flux may also incorporate features for the attachment of replaceable components which are non-ferromagnetic, ferromagnetic, or a combination of both magnetic types of material for the purpose of modifying the magnetic performance of the machine.

In another embodiment, counterbored holes are provided in flanges on the magnet carrier assembly for receiving screws therethrough which are screwed into threaded holes in the rim of the axial field disc rotor. The truncated end region of the magnet carrier assembly includes a wedge shaped locating tab co-extensive with the base and which tab is complementarily received in a slot in the radially innermost wall of the recess formed in an axial disc rotor to locate and hold the truncated end region of the magnet carrier assembly. A longitudinally extending key is formed on the outwardly facing base surface and is received in a mating groove in the surface of the recess in the axial disc rotor when the magnet carrier assembly is in place. The key is used to fixedly locate the carrier and transfer to the rotor the net electromagnetic shear force developed by the high-energy-product permanent magnet carried within the magnet carrier assembly. The high energy product permanent magnet is installed in the magnet carrier container with the magnet material in an unmagnetized state. The open top of the container is closed by a cover attached to the side walls and to the upper and lower transverse walls of the carrier, for example, by welding. The magnet may thereafter be handled safely during both magnetization and installation into the motor.

In another embodiment of the present invention, the rotor comprises an approximately cylindrical body having a plurality of phase poles configured along a cylindrical rotor surface with one of the magnet carrier assemblies located at each pole location. Also included are retainer elements for fixedly positioning individual magnet carrier assemblies relative to one another and relative to the rotor and for providing the necessary strength to resist operational and environmental forces. At high speeds, it is desirable to eliminate stress concentrations from the rotor element which receives the magnet centrifugal forces. In this embodiment, the centrifugal forces are carried by a drum. The relative positions of the magnets are assured by components whose own centrifugal forces are carried by the rotor drum.

In still another embodiment, the magnet carrier assemblies are located in part by a cup member which is received by an inner surface of the rotor and which, itself, is held in position by a retainer. In certain other embodiments, each carrier assembly further comprises a hook adapted to be received at an end rim surface of the rotor.

In yet another embodiment, an electric machine employing at least one high-energy-product permanent magnet is disclosed, and includes a rotor having a plurality of poles located along the rotor; stator cooperating with and adjacent to the rotor; apparatus for supporting the rotor and the stator for relative rotation between the rotor and the stator. There is a carrier for receiving a high-energy-product permanent magnet and attachment mechanism for releasably positioning the carrier on the rotor at a pole location to immobilize a magnet received in the carrier relative to the rotor; wherein the carrier and the attachment mechanism provide a magnetic flux path between a magnet received in the carrier and the rotor when the carrier is positioned on the rotor.

BRIEF DESCRIPTION OF THE DRAWINGS

Other features and advantages of the present invention will become readily apparent from the following written description and drawings wherein:

FIG. 3 is a radial view of the magnet carrier assembly showing the locating and mounting tabs that are mated with other mounting tabs in certain embodiments of the present invention and which are screwed to the rim of the axial disc rotor for releasable attachment of the magnet carrier assembly to the rotor.

FIG. 4 is a side view of a present magnet carrier assembly showing a longitudinally extending key along the outwardly facing surface of the base and a wedge shaped locating tab projecting from the end disposed opposite the rim locating and mounting tabs.

FIG. 5 is an exploded view of the magnet carrier assembly of FIG. 4 showing the open top container, high-energy-product permanent magnet, and cover in one possible arrangement of the components to form the completed magnet carrier assembly.

FIG. 12 is a simplified schematic illustration of a retainer and cup member with one magnet carrier assembly as used with the electric machine of FIG. 9.

FIG. 13 is a further sectioned view of a magnet carrier assembly and a portion of the rotor assembly of FIG. 9.

FIG. 13A is a enlarged view of a portion of the interface between the magnet carrier assembly and the rotor assembly shown in FIG. 13.

DESCRIPTION OF THE PREFERRED EMBODIMENT

Figure 1:
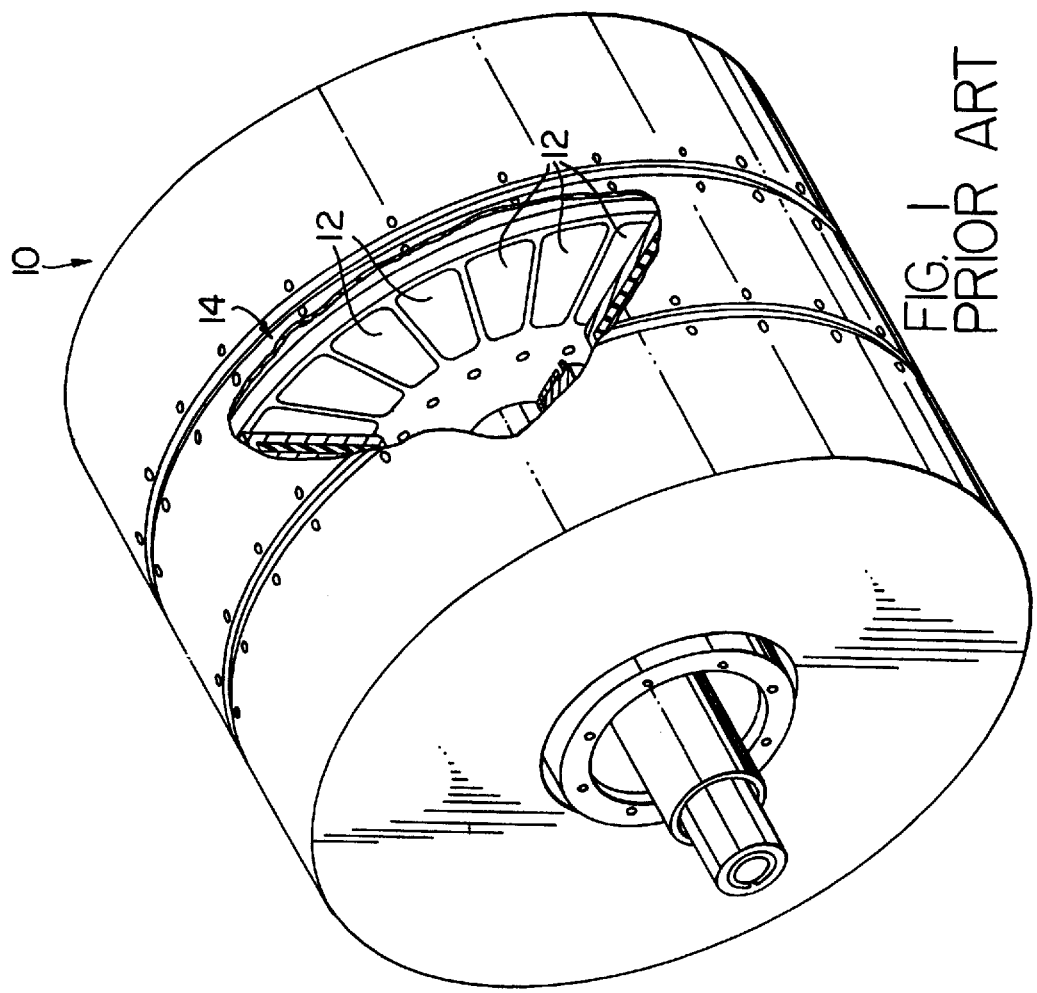
FIG. 1 is a partially cut away, schematic representation of a high horsepower axial disc electric machine of the prior art.

Turning now to the drawings and considering the invention in further detail, a high horsepower, high performance electric machine of the type with which the present invention may be practiced is shown somewhat schematically in FIG. 1 as a motor generally designated 10 and partially cut away to reveal an axial field disc rotor 14. Typically, such a high horsepower, high performance electric machine may develop several thousand horsepower and requires high intensity magnetic fields for its operation. The axial disc electric machine 10 illustrated is conventional in the sense that the magnets 12, 12 forming the poles of the electric machine are mounted in a conventional and well known manner in the radial plane of the rotor 14. Although the electric machine 10 of FIG. 1 is illustrated as one having an axial disc rotor 14, it will be understood that the present invention can also be practiced with an electric machine having a drum type rotor as detailed hereinafter.

Figure 2:
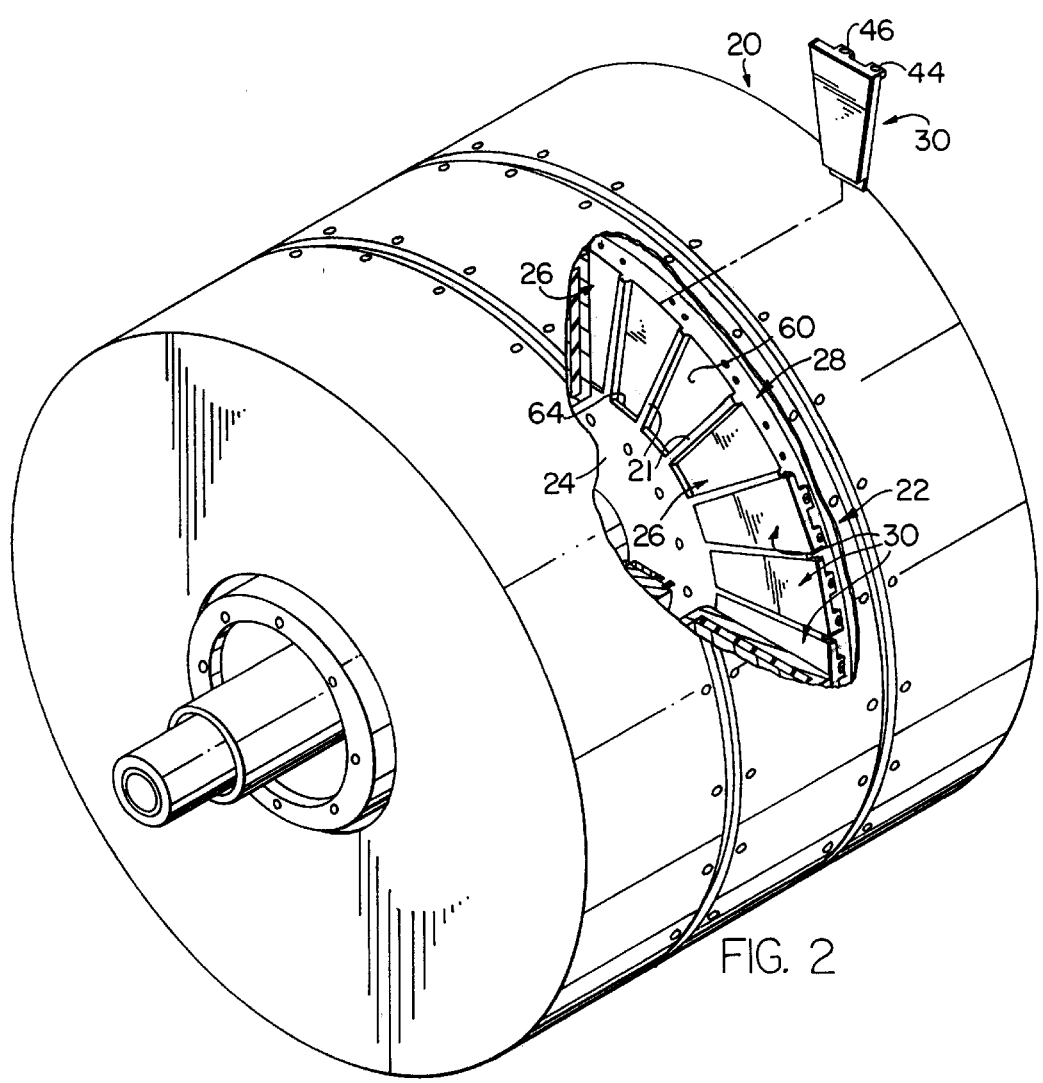
FIG. 2 is a partially cut away, schematic representation of an axial field disc electric machine showing a magnet carrier assembly embodying the present invention attached to a rotor at each pole.

Turning now to FIG. 2, the axial field disc rotor motor illustrated therein is seen to be similar to the axial disc rotor motor of FIG. 1. The axial disc rotor motor of FIG. 2 is generally designated 20 and includes an axial disc rotor generally designated 22. The face 24 of the axial disc rotor 22 is formed with a plurality of radially inwardly extending wedge or trapezoidal shaped recesses 26 circumaxially and equidistantly spaced from one another about the outer peripheral circumference or rim 28 of the rotor 22. Each recess 26 has a size and shape as will be explained in further detail below to receive a magnet carrier assembly generally designated 30. The magnet carrier assembly 30 carries and provides support for the high-energy-product permanent magnet and provides a means of releasable attachment to the axial disc rotor. The motor 20 is characterized by a plurality of dividers 21 between the recesses 26. The dividers are made from a nonferromagnetic material.

Figure 2A:
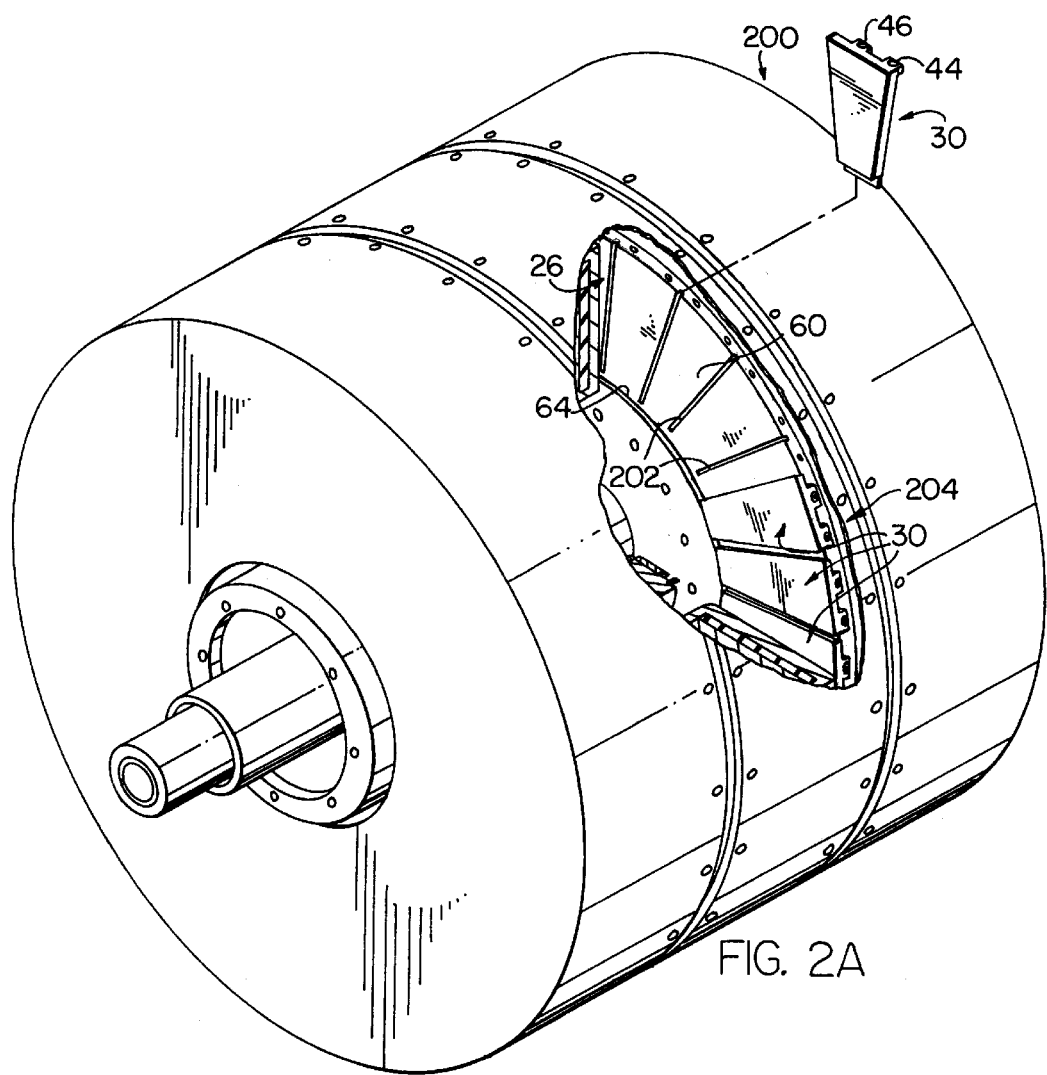
FIG. 2A is a partially cut away, schematic representation of an alternative axial field disc electric machine provided in accordance with the present invention.
Figure 2B:
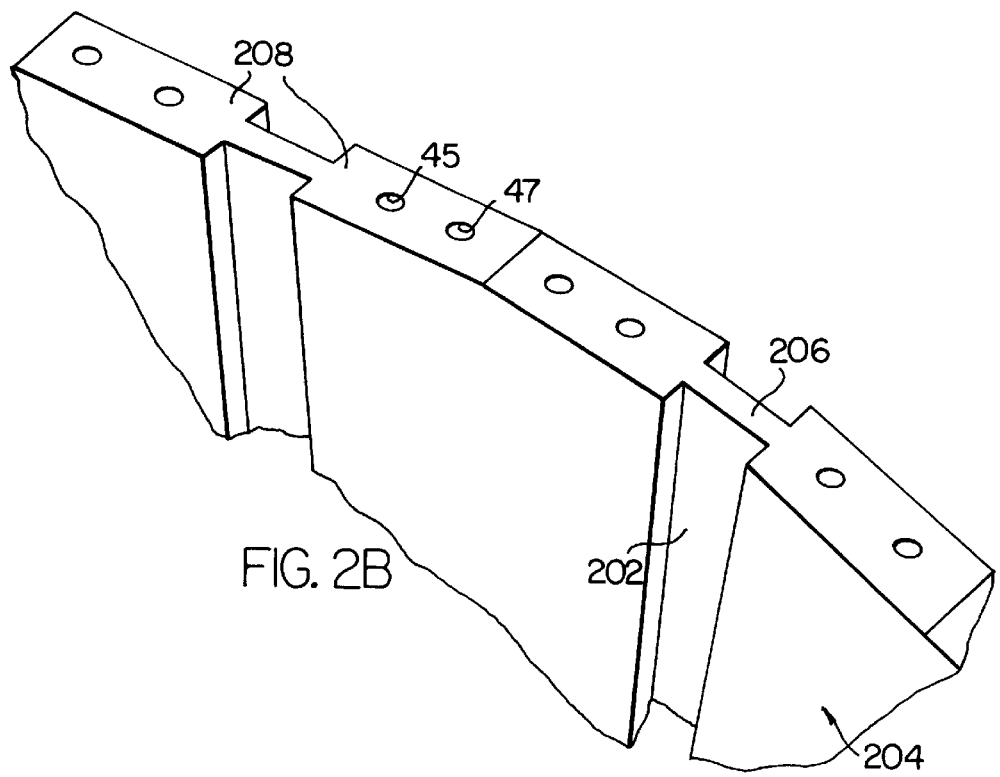
FIG. 2B is a schematic representation of a portion of a rotor found in the axial field disc electric machine of FIG. 2A.

An alternative embodiment of the present invention is shown schematically in FIGS. 2A and 2B. A dividerless axial disc rotor motor 200 is configured in a manner similar to the motor of FIG. 2. However, in lieu of the pockets created by the dividers, the motor 200 includes a plurality of radial key slots 202 circumaxially and equidistantly spaced from one another about rotor 204. Each slot is designed to receive a corresponding key on a magnet carrier assembly. As seen in FIGS. 2A and 2B, the slots extend outward to the outer perimeter surface or rim 206 of the rotor 204. The slot and key configuration obviates the need for additional structure because there is sufficient strength to fixedly locate the magnet carrier assemblies. The outer perimeter surface of rotor 204 is characterized by a plurality of flats 208 adapted to receive mounting flanges of the magnet carrier assemblies, as detailed hereinafter.

Turning now to FIGS. 3–5, a magnet carrier assembly 30 embodying the present invention is discussed in further detail. The magnet carrier assembly 30 includes a container 32 having a wedge or trapezoidal shaped base or bottom 34 having a lower or outwardly facing substantially flat surface 54 and an inner surface 56 and oppositely disposed upwardly extending sidewalls 36, 38 extending upwardly from the base 34. An upwardly extending wall 40 extends transversely between the walls 36, 38 connecting the walls and the base and is located at the inner end 37 of the container 32. A mounting flange 41 is disposed opposite the wall 40 and includes a main upper portion 42 which extends transversely between the walls 36 and 38 to complete the container 32.

The lower portion 43 of the mounting flange has two rectangularly shaped tabs or ears 44, 46 extending substantially perpendicular to the plane of the base 34. The tabs 44, 46 have counterbored holes 48, 50 in some embodiments to receive machine screws which pass through the holes and are screwed into threaded bores in the rotor rim such as bores 45, 47 shown in FIG. 2B. In some embodiments of the present invention, the holes in the mounting flange need not be counterbored. The threaded bores in the rim are in registry with the holes 48, 50 when the magnet carrier assembly 30 is attached by the mounting flange 41 to the rim. The tabs 44, 46 are also sized and shaped to be received within corresponding tabs on an opposed magnet carrier assembly in those embodiments in which magnet carrier assemblies are positioned on both sides of the rotor, as detailed hereinafter.

When used with rotors of the type shown in FIG. 2A, the base 34 also includes a longitudinally extending key 52 formed on the outer surface 54 of the base 34. Surface 54 is in facing relationship with radial surface 60 of the axial disc rotor 204 when the magnet carrier assembly 30 is in its mounted or attached position. The key 52 is complementarily received within a radially extending mating groove or slot 202 formed in the surface 60 of the axial disc rotor 204. The function of the key 52 received within the mating groove 202 when the magnet carrier assembly is attached to the axial disc rotor is to accurately locate the magnet carrier assembly. This allows for safe, controlled installation and removal of the magnet carrier assemblies and lowers the stress imparted to the mounting flanges. Additionally, the key is strong enough to transfer to the axial disc rotor the electromagnetic shear force developed by the high-energy-product permanent magnet carried within the magnet carrier assembly.

The magnet carrier assembly 30 further includes a wedge shaped locating tab 62 which is coextensive with the base 34 and projects therefrom beyond the wall 40. The tab 62 is received by slot 64. The tab 62 functions to locate the magnet carrier assembly 30 against the rotor surface 60. The magnet carrier assembly is located on the rotor disc rim flat 208 by flange surface 66. The installation is completed when the mounting screws which pass through the holes 48, 50, respectively, are screwed into the threaded holes 45, 47 in the rim 206 thereby attaching the magnet carrier assembly to the axial disc rotor. The magnet carrier assembly 30 is easily detached from the axial disc rotor by reversing the mounting sequence. The base 34 of the magnet carrier assembly 30 is preferably made of steel or other suitable ferromagnetic material for transmitting the maximum magnetic flux into the rotor disc. The sidewalls 36, 38, 40 and 42 may be either metallic or nonmetallic but are preferably non-ferromagnetic.

As illustrated in FIG. 5, a high-energy-product permanent magnet 68 having a size and shape corresponding generally to the interior 33 of container 32 is received therein. The magnet in the embodiment shown in FIG. 5 is of unitary construction. However, those skilled in the art will note that other alternative designs for the magnet are contemplated by the present invention, including an array of permanent magnet elements sometimes referred to as magnet modules received in the carrier subsequently magnetized in a conventional manner and separated by shock absorbing material such as silicone rubber. In addition, the magnet construction can be of a laminate design, as is known in the art.

A cover generally designated 70 is then placed over the magnet 68 to close container 32 and hold the magnet therein. The cover 70 may take a number of different forms and although illustrated as a rigid piece in FIG. 5, the cover 70 may in fact not exist as a separate rigid part. The cover 70 may be made of fiberglass and epoxy and may be molded onto the magnet and the open top container to encapsulate the magnet and form the completed magnet carrier assembly.

The purpose of magnet encapsulation is both to retain and locate the magnet material within the carrier and also to prevent corrosion. In the embodiments shown, the cover is of a material weldable to the sidewalls 36, 38, 40, 42, for example a ferritic or austenitic stainless steel cover with austenitic stainless steel walls. The cover is attached by a welding process characterized by very localized heat deposition, such as electron beam or TIG fusion welding.

A B-stage pre-impregnated glass cloth may alternatively be used to form the fiberglass and epoxy cover as illustrated in FIG. 5. It may also be desirable to add spacers 72 along the inner surfaces of the walls 36, 38, 40, 42 as necessary to insure a snug fit of the magnet in container 32. The spacers not only compensate for tolerance differences but also provide additional shock absorption to protect magnet 68.

In the preferred embodiment of the invention, the high-energy-product permanent magnet 68 is installed into the magnet carrier while the magnet 68 is in an unmagnetized state so that the magnet can be manually handled without any special precautions. After the magnet is installed into the magnet carrier to form the magnet carrier assembly, the magnet may be magnetized and normal precautions for handling a magnet in the vicinity of ferromagnetic objects will be observed. However, in an instance where the magnet carrier assembly containing a magnetized permanent magnet does accidentally come into contact with a ferromagnetic object, the encapsulation of the permanent magnet within the magnet carrier substantially reduces or eliminates any possibility that the magnetic material of the permanent magnet will be damaged.

Since each of the permanent magnets forming a phase pole of the electric machine is releasably attached to the axial field disc rotor, individual magnet carrier assemblies can be detached and removed from an otherwise completely assembled electric machine. The magnet carrier assembly of the present invention permits the expense associated with the manufacture of a motor to be substantially reduced and the complexity of assembly is greatly simplified because the ferromagnetic parts of the motor may be assembled in their final relationship to one another before any of the permanent magnets are finally assembled and thus, the parts will not have any tendency to be attracted to one another during assembly. When the permanent magnets are finally installed, they may be installed one at a time thus greatly simplifying any magnet installation tools that may be required because the magnetic force developed is that of only one permanent magnet rather than the force developed by the total number of magnets that would be normally present during conventional construction and assembly methods of a conventional electric machine.

A further feature of the magnet carrier assembly of the present invention permits the permanent magnets used in an electric machine to be removed individually for service or for any other reason. One such reason for disassembly would be to remagnetize a magnet which becomes demagnetized by accident. Such an event leading to the demagnetization of a magnet would be for example, a fire in a motor and if such an event should occur, the required repair can be made to the motor directly in the field. The magnet carrier assembly including the magnet can be removed, remagnetized and then reinstalled into the motor. The magnet assemblies may be shipped to an offsite location where reenergization may be done or, alternatively, a magnetizing apparatus can be brought directly to the electric machine in the field and the reenergization done directly on site.

Figure 8:
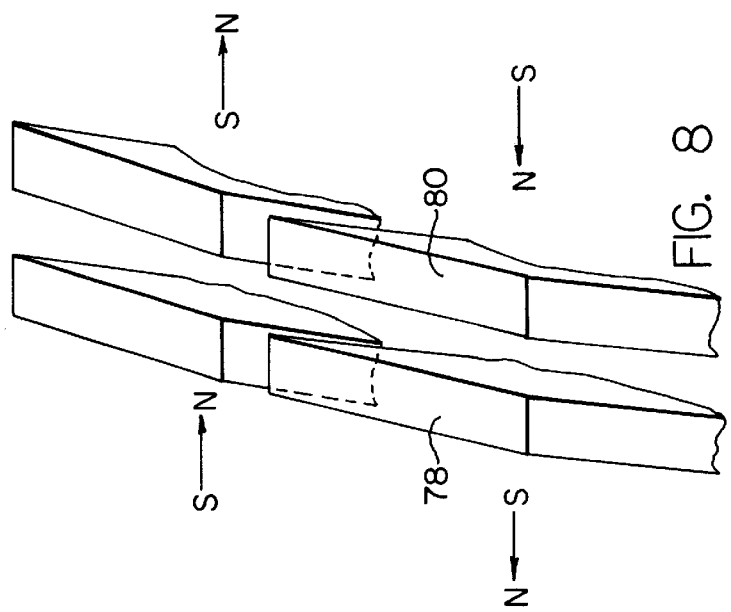
FIG. 8 is a simplified schematic illustration of two pairs of opposed magnet carriers of the embodiment of FIG. 6.
Figure 7:
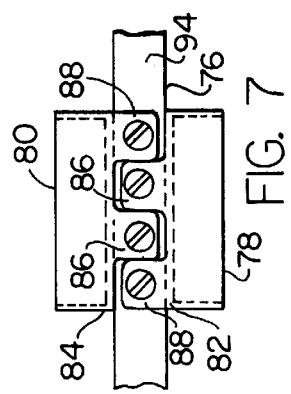
FIG. 7 is a detailed schematic illustration of opposed symmetric magnet carrier assemblies affixed to the rotor rim in the embodiment of FIG. 6.
Figure 6:
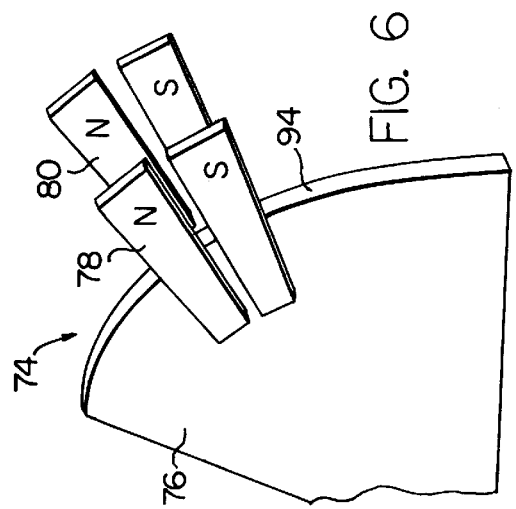
FIG. 6 is an exploded schematic illustration of a portion of an axial rotor and opposed permanent magnet carrier assemblies of a first alternative embodiment of the present invention.

Referring now to FIGS. 6–8, there is shown a schematic illustration of a portion of an alternative electric machine 74 provided in accordance with the present invention. The alternative machine is also an axial field disc electric motor and is characterized by a central disc rotor 76 which, when assembled, contains permanent magnets positioned on both sides thereof. The magnets are received in symmetric magnet carrier assemblies 78, 80 to be received on opposite sides of the disc rotor. Generally, the carrier assemblies are substantially identical to those described hereinabove. Alternatively, the electric machine can be configured to have a dividerless rotor as shown with respect to FIG. 2B. However, the carrier assemblies are complementary in that mounting flanges 82, 84 each have engagement tabs or ears 86, 88 that are configured so that the tabs of opposed carrier assemblies alternate when received on a rotor disc rim surface 94. When assembled, the symmetric carrier assemblies are positioned on opposite sides of the central disc in substantial registration.

In a preferred embodiment, the mounting flange and its two rectangularly shaped tabs are configured so that each pair of magnet assemblies can be received in the rotor disc as detailed above. Installation and removal can be done independent of any other magnet carrier on the disc, including the opposed, symmetric carrier assembly. A magnet is positioned in each carrier assembly so that the opposed, complementary pairs of permanent magnets are magnetized so that the magnetic flux is passed through the disc. In the embodiment shown in FIGS. 6–8, this requires the permanent magnets to be placed with opposite magnetic poles facing towards one another.

Permanent magnet motors of disk configuration can be made in one-sided or two-sided versions. In a one-sided configuration, only one of the two disc faces has an armature opposite it and only that face need have magnets installed. In this case, the rotor disc is preferably of ferromagnetic material, and is thick enough to carry magnet flux without magnetic saturation. FIGS. 2 and 2A imply a one-sided configuration, although all the features shown can be duplicated on the back side of the disc to make a two-sided motor. In the two-sided versions, two armatures are used, one facing each side of the disc. In this case, the embodiment illustrated in FIGS. 6 through 8 is advantageous.

Two-sided embodiments are preferred for large machines, because the magnetic force attracting the rotor to one stator is largely canceled by the oppositely directed magnetic force attracting it to the other stator. In single-sided configurations, this large thrust force must be borne by a thrust bearing.

Figure 9:
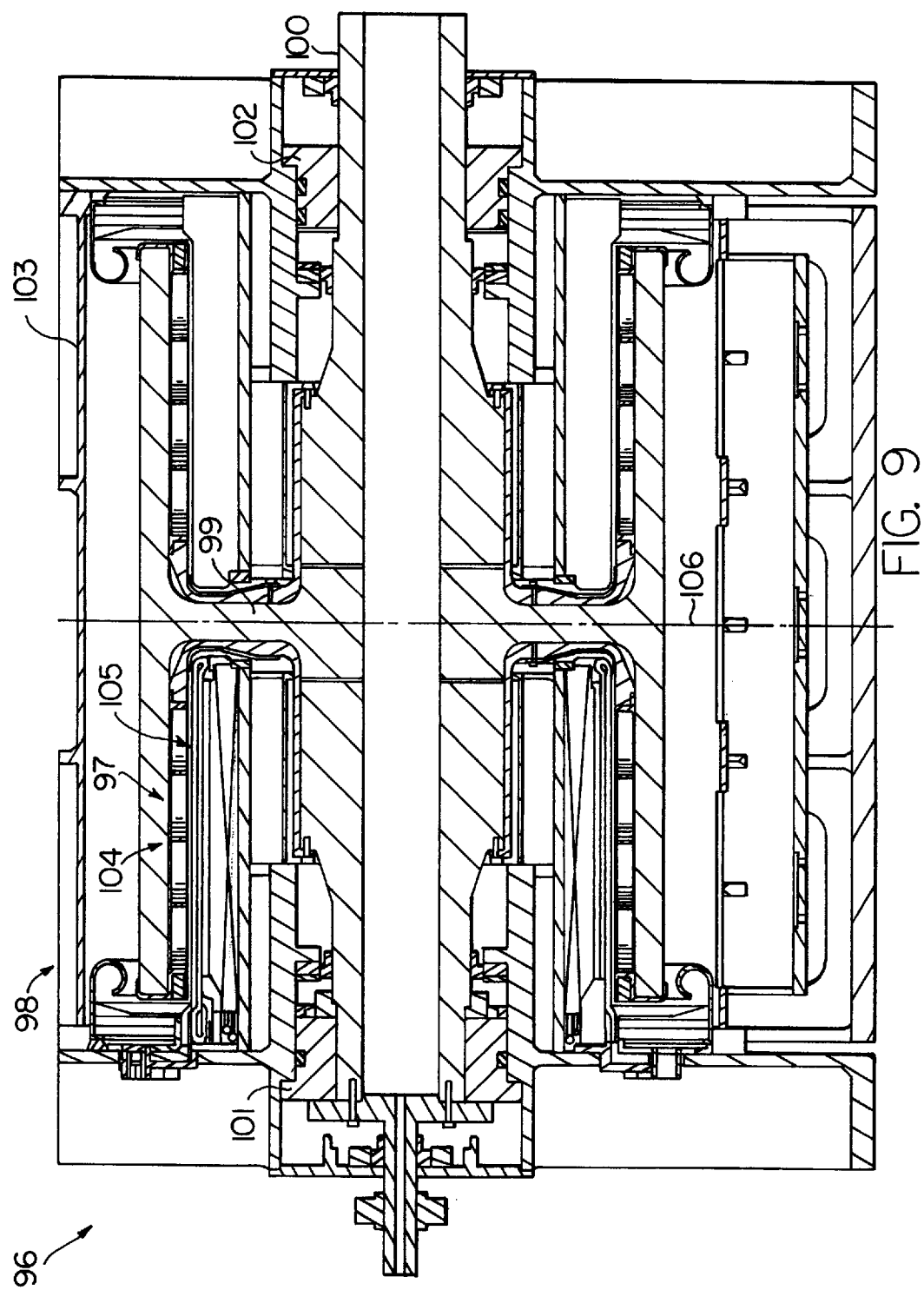
FIG. 9 is a sectioned illustration of another alternative embodiment of an electric machine provided in accordance with the present invention characterized by a drum rotor.

Referring now to FIG. 9, there is shown, in section, a schematic illustration of an alternative electric machine provided by the present invention. The alternative electric machine 96 is characterized by a drum rotor assembly 98 which extends substantially about the outer circumference of the active portion of the machine. The rotor assembly 98 is drum shaped and includes a radial, centrally extending hub 99 that acts as a support and which is integral with a preferably hollow rotating shaft 100. The rotating shaft is supported by conventional end bearings 101, 102 within the machine housing 103. The rotor assembly includes a central cup member 104 and an armature assembly 105 on either side of a central plane 106. A design having a single cup member can be used in an alternative embodiment. The electric armature assembly 105 is configured in a known manner to be in substantial registration with the appropriate portions of the rotor assembly, and be in magnetic communication therewith. Each magnet carrier assembly 107 includes a plurality of magnets 138 (FIG. 15) which may be configured as one or more magnet modules 97. The magnet carrier assembly 107 is located by the cup member 104 which itself is partially held in position by a magnet module retainer 108 more clearly seen in FIG. 13. The section view of FIG. 9 also shows several conventional components and systems used for cooling and transferring electrical power.

Figure 10:
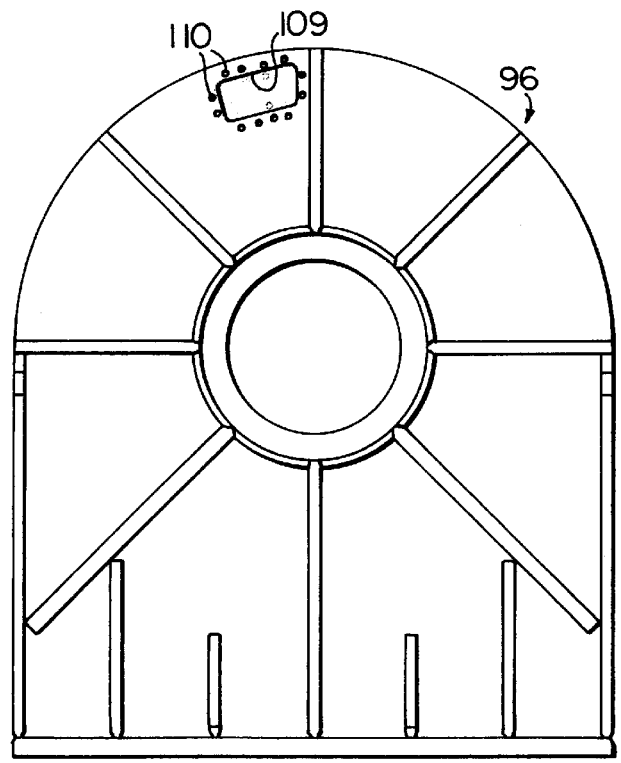
FIG. 10 is an end view of the electric machine of FIG. 9 showing a port for magnet carrier assembly insertion and removal.

Referring now to FIG. 10, there is shown an end view of the machine 96 of FIG. 9. There is a magnet access port 109 located in substantial registration with magnet modules as described hereinafter to allow their individual installation and removal. The perimeter of the port has tapped holes 110 for attachment of a cover (not shown) which may also be used for attaching any magnet loading mechanisms needed for safety or other reasons.

Figure 11:
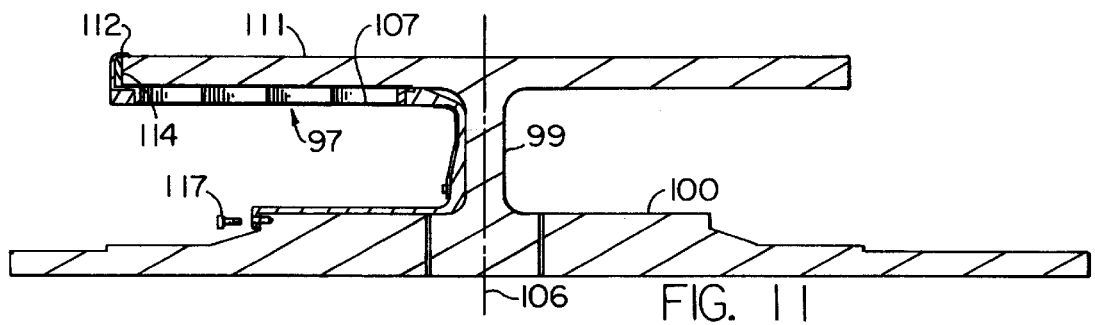
FIG. 11 is an axially sectioned illustration of a portion of the drum rotor assembly of the electric machine of FIG. 9.

In FIG. 11, there is shown a simplified sectional view of the rotor assembly shown in FIG. 9. The rotor assembly is further comprised of a drum-like cylindrical rotor body 111 of high strength ferromagnetic alloy which receives the magnet module retainer 108 and, ultimately, the magnet modules 97 along an inner rotor surface. The magnet module retainer is affixed by bolts 117 screwed to the rotor shaft 100 at a low stress region in the shaft.

As shown in FIG. 12, each magnet carrier assembly 107 has a hook 112 which is seated on a portion of rotor rim 113 to assure there is no relative radial motion between the two parts if the machine is accelerated laterally when not operating such as by shock. There is a separate magnet module spacer ring 114 at the open end of the cup member 104 to assist in maintenance of tangential spacing of the magnets relative to one another. The spacer ring 114 may be radially supported by the magnet module hook 112 or the rotor body 111. The spacer ring design incorporates sufficient compliance so that it does not fail by fatigue and sufficient stiffness to perform the relative magnet module positioning function.

Referring now to both FIGS. 12 and 13, there is schematically shown a portion of the rotor assembly including the magnet carrier assembly 107 and magnet module retainer 108 of FIG. 11, both in perspective and in section. In FIG. 12, the rotor body 111 is partially shown in phantom. The magnet module retainer is partially self supporting against centrifugal loads and partially supported by the rotor body. The cup member 104 includes radial slots 115 as shown to allow for circumferential growth due to centrifugal loads. There are a plurality of recesses 116 spaced about cup member outer surface 118 to receive magnet carrier assembly tabs 120 which fix the magnet carrier assembly tangential position and prevent rotation about a radial axis. The magnet carrier assemblies 107 are connected to the cup member 104 by bolts 122. The bolts or other equivalent fasteners are preferably held captive in receptacles 124 when detached to prevent hardware from dropping inside the machine.

The present rotor assembly also allows for the attachment of auxiliary components such as a combined aerodynamic cover and coolant director 126 without introducing stress concentrations in the highly stressed rotor body 111 or hub 99. The magnet carrier assembly incorporates features for the attachment of an eddy current shield 128 on the magnet carrier assembly inside face. As shown in FIG. 13A, there is also provision for a spacer 130 between the magnet carrier assembly outer skin 132 and the rotor body. The spacer may be used to change the machine magnetic characteristics. This is accomplished by a change of spacer material from nonferromagnetic to ferromagnetic or a combination of both materials. Either the eddy current shield 128 or the spacer 130 may have features to enhance heat transfer or allow for coolant flow. The hook 112 of the magnet carrier assembly 107 has a balance block 134 which contains many variable balance weights. In a dual cup rotor this allows for two-plane, dynamic balancing. Some embodiments include aerodynamic covers for the balance weights.

Figure 13B:
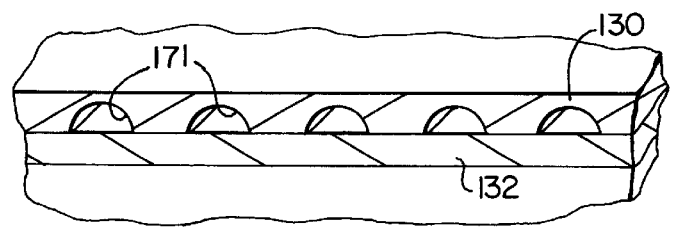
FIG. 13B is a more detailed view of the rotor portion shown in FIG. 13A.

Visible in FIG. 13B are semicircular or equivalently shaped grooves 171 in spacer 130 that form passages for the axial flow of a coolant liquid. Similar features can be incorporated in disc machines to accommodate radial flow of coolant liquid. In radial flow machines, centrifugal force is more than adequate to establish flow. In an axial flow (radial gap) embodiment, a very modest amount of draft (change of radius with axial position) provides adequate pressure head to drive flow.

Figure 13C:
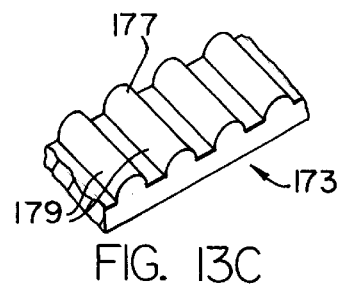
FIG. 13C is a simplified schematic illustration of an alternative magnet carrier assembly cover having enhanced cooling.

The magnet carrier assembly can also be modified to enhance cooling. FIG. 13C is a simplified schematic illustration of a cover 173 alternative to the magnet carrier assembly cover 70 shown in FIG. 5. The area of surface 177 has been much increased by the provision of cooling fins 179. These cooling fins project into the air gap and thus are exposed to airflow by virtue of the rotor motion. The fins shown lie parallel to the motion of the part, but the fins can be placed at an angle. In this configuration, they would still provide cooling but would additionally pump radial flow in an axial gap machine, thereby enhancing not only heat exchange between magnet and air, but also convective replacement of the air thus heated.

Figure 14:
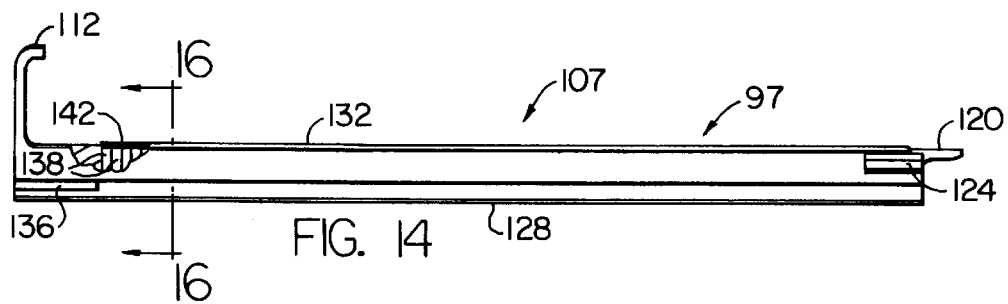
FIG. 14 is a side view of a magnet carrier assembly of the electric machine of FIG. 9.
Figure 15:
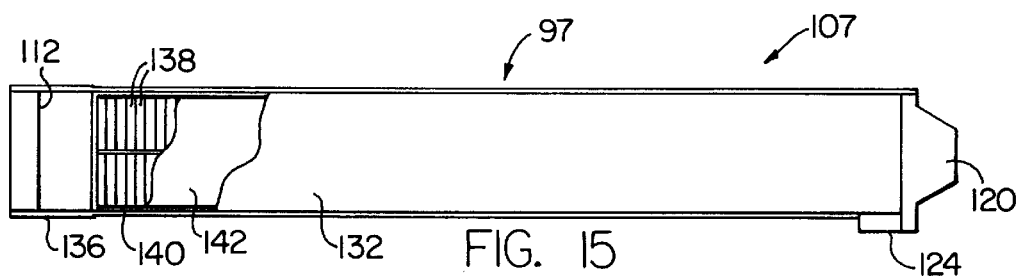
FIG. 15 is a radial view of a magnet carrier assembly of the electric machine of FIG. 9.
Figure 16:
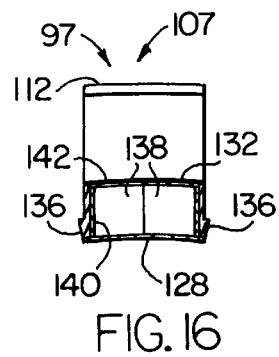
FIG. 16 is an axial section view of a magnet carrier assembly of the electric machine of FIG. 9.

FIGS. 14, 15 and 16 show, respectively, tangential, radial and axial views of the magnet carrier assembly 107 with partial cut away views of the internal components. The tangential relative position of the magnet carrier assembly can be assured by a spacer ring 114 as in FIG. 13 or by locating lands 136 which can be custom fitted at assembly so that there is a minimal gap or slight interference at these lands taken as a full circle of magnet carrier assembly installed in the rotor cup member 104. In the preferred embodiment the individual magnets or pieces of magnetic materials 138 are cushioned in the tangential directions by elastic spacers 140 and radially by a relatively stiff cushion 142 between the magnets and the module outer skin. As in the axial disc embodiments there may be a plurality of magnet modules comprised of a plurality of magnets. The individual magnets may be bonded together axially or separated by thin cushioning material. The magnets are subdivided both to minimize eddy current heating and to protect from breakage due to elastic deformations in a high speed rotor.

Figure 17:
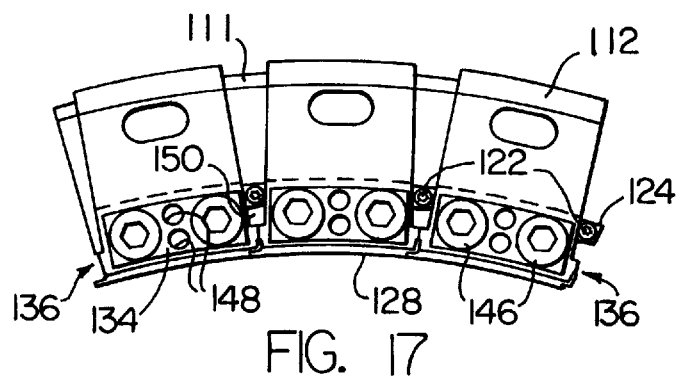
FIG. 17 is an axial view of the magnet carrier assembly showing a rotor retention hook, balance weights and threaded holes for attachment of an extraction tool.
Figure 18:
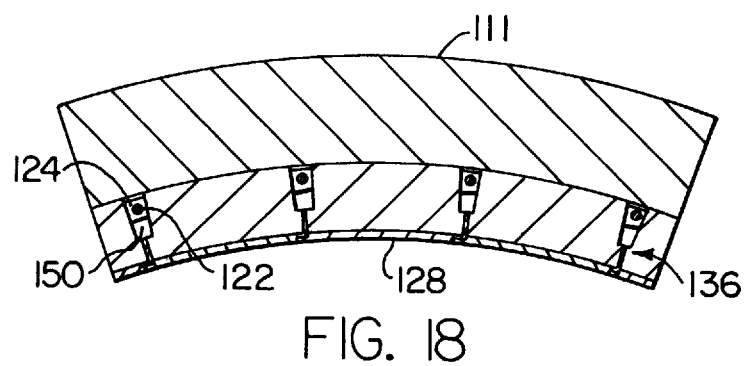
FIG. 18 is a simplified axial section illustration through a portion of a drum rotor assembly of FIG. 13.

FIG. 17 shows the axial view of a hook balance block 134 containing two balance weights 146 and tapped holes 148 for module installation or removal attachment of assembly tooling. FIG. 18 shows the air space 150 between magnet modules 97 which is used for tool access for fastening the magnet modules to the cup member. The nature of the tangential fit lands 13b is also shown in FIG. 18.

Figure 19:
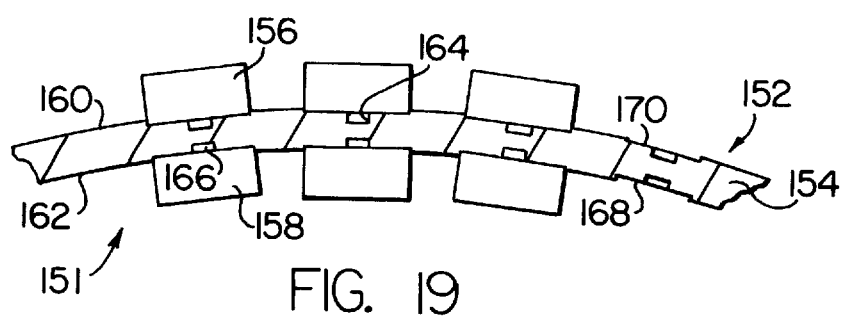
FIG. 19 is a simplified axial section illustration through a portion of a drum rotor assembly of an alternative embodiment of the machine shown in FIG. 9.

FIG. 19 is a simplified, schematic, axial section illustration through a portion of another alternative electric machine 151 having a drum rotor assembly 152. The drum rotor assembly 152 is comprised of a rotor 154 that is adapted to receive magnet carriers 156, 158 along both outer and inner rotor surfaces 160, 162. The alternative drum rotor assembly is similar in several respects to the axial embodiment of the present invention shown in FIGS. 2A and 2B, including slots 164 in the rotor. These slots receive keys 166 to hold the magnet carriers in place. The drum rotor shown in FIG. 19 is especially useful in low speed applications where the magnitude of the centrifugal forces are substantially reduced due to the slower rotational speed of operation. The rotor may additionally include a plurality of flats 168, 170 which are machined into the rotor surface and are adapted to receive the magnet carriers. The magnetic circuit configuration for this embodiment would be substantially similar to that shown with respect to the axial gap embodiments of FIGS. 6–8. Consequently, parameters such as the rotor thickness can be reduced or otherwise adjusted for the same reasons as set forth above.

The value of demountable magnets in permanent magnet electric machines is much increased by the ability to use a mechanism for installing and removing the magnet carrier assemblies individually, without removing or disassembling the motor itself. An apparatus in accordance with the present invention that performs these functions is described with respect to FIGS. 20–22. Essentially, the apparatus consists of guide ways which control the path of the permanent magnet carrier as it is being inserted into or alternatively removed from the motor. The apparatus also provides a means of propulsion for the magnet, in the form of a lead screw device in the preferred embodiment.

It is important that the means of propulsion provide both a thrusting force and a resisting force. In the early stages of insertion, for example, the magnet can be expected to be met with resistance due to friction and drag, but as the magnet nears its favored position, that is as it gets into the proximity of the iron within the motor, it can be drawn into the magnet space. Consequently, the apparatus at that point is acting as a retarding mechanism, holding the magnet back.

The key to a useful magnet insertion/removal apparatus is to be absolutely certain that, when the magnet carrier assembly is in the apparatus, the magnet carrier assembly can move in a desired direction and cannot move in any other direction. This concept is fundamental since magnets, when attracted to ferromagnetic objects, are subjected to complex combinations of lateral forces, torques and moments that are very difficult to anticipate in advance. The preferred apparatus precludes motion in any direction except the direction intended.

Figure 20:
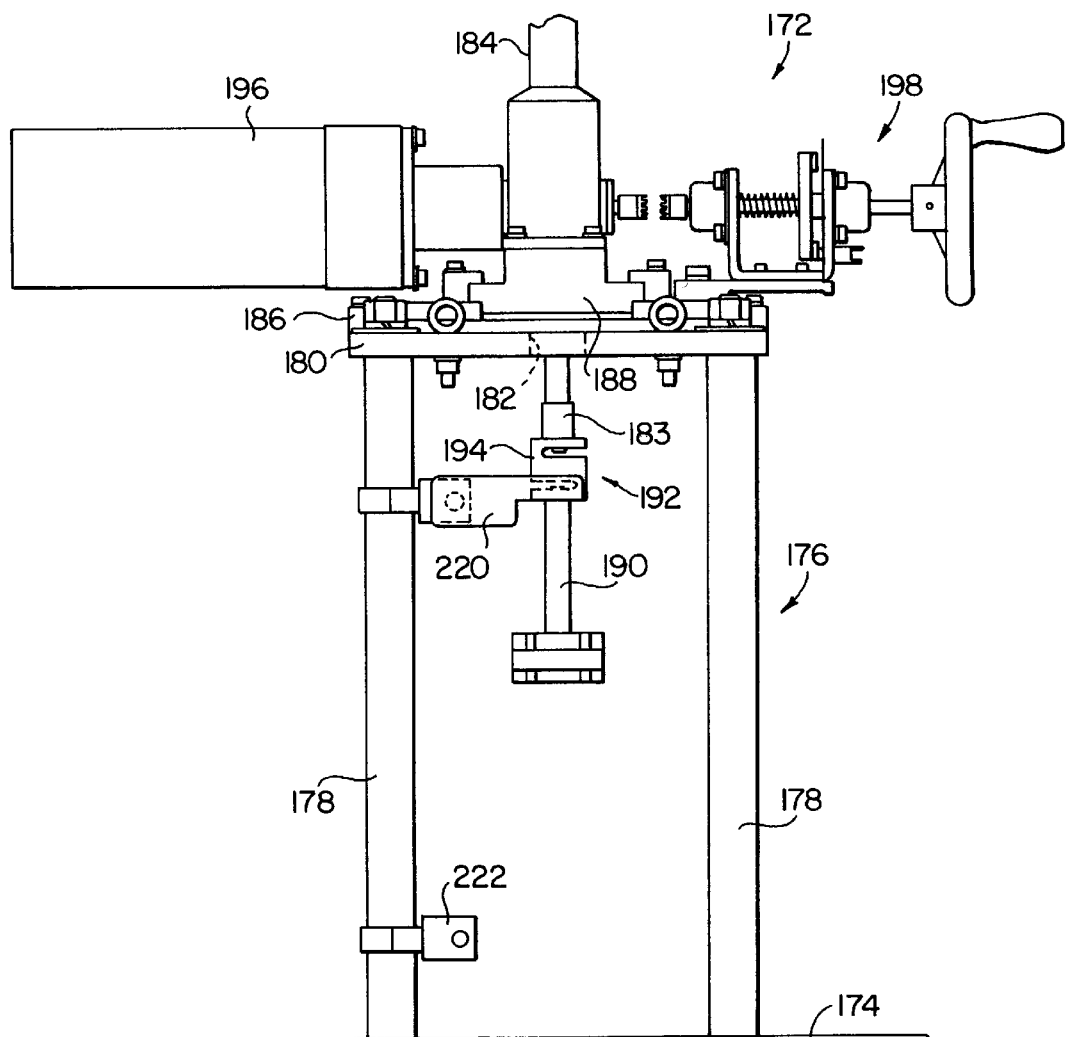
FIG. 20 is a simplified schematic illustration of an apparatus for the insertion and removal of magnet carrier assemblies provided in accordance with the present invention.

Referring now to FIG. 20, there is schematically shown a portion of an insertion/removal apparatus 172 that comprises a bottom plate 174. There is a support mechanism 176 which is affixed to the bottom plate and extends outwardly therefrom. In the embodiment shown, the support mechanism includes a plurality of stand-offs or rods 178 attached to the bottom plate. Spaced from the bottom plate by the standoffs is a top plate 180 that has a central opening 182 through which is passed an installation bar 183 from a ball screw mechanism 184. There is a turntable 186 to allow the apparatus to rotate when used with axial disc motors of the type shown in FIGS. 6–8. Slide 188 is also included in some embodiments on the top plate which allow for slight adjustments in the relative position of the ball screw to ensure proper alignment with other apparatus components.

A pushrod 190 is attached to the ball screw by means of a coupling device 192 which can be a clevis and pin combination in some embodiments or thrust driver 194 as shown in FIG. 20. There is also a tie rod in some applications which, for alignment purposes, allows for a slight relative motion between the pushrod and ball screw. Movement along an insertion/removal axis is accomplished via motor 196 and/or handcrank assembly 198. Those skilled in the art will note that other equivalents to the components enumerated above may be substituted in accordance with the requirements of the application. In addition other safety or control apparatus can be included such as beam cutter 220 and limit switch 222.

Figure 21:
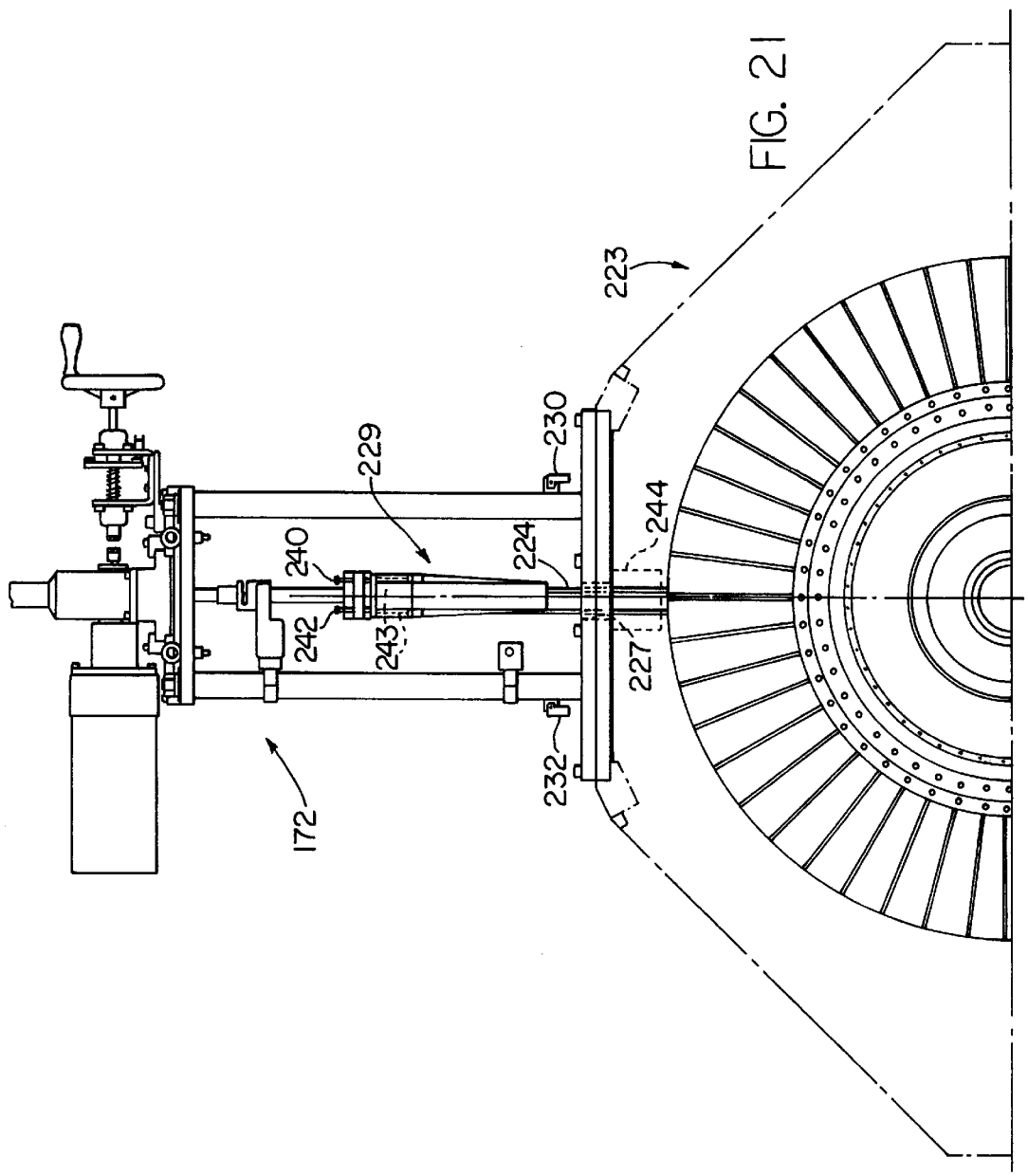
FIG. 21 is a simplified schematic illustration of the apparatus of FIG. 20 as mounted on an axial field disc rotor electric machine of the present type.
Figure 22:
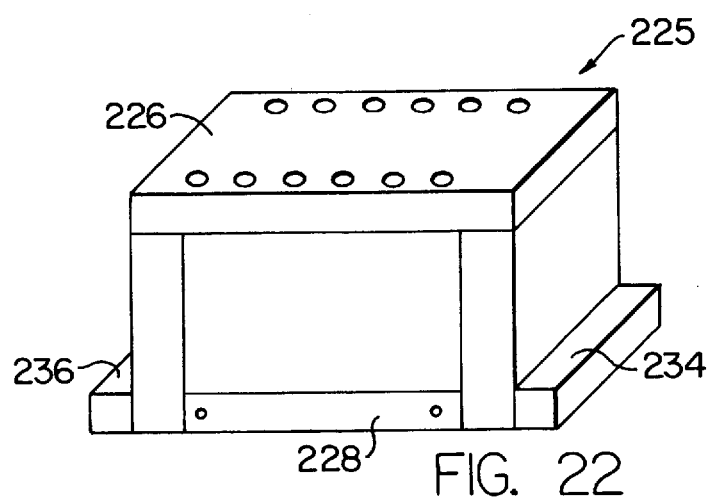
FIG. 22 is a simplified schematic illustration of a keeper box as provided in accordance with the present invention.

To initiate removal or insertion, the bottom plate is affixed to a motor over a motor access port such as port 109 shown in FIG. 10. Thereafter the remainder of the removal/installation apparatus is constructed in place. Alternatively, all or a subset of the above removal/installation apparatus components are assembled remote from the motor before final installation. In FIG. 21, the complete installation/removal apparatus 172 is shown installed on electric machine 223. An alignment rod 224 is initially used in some embodiments to engage and align the removal/installation apparatus with the keyway or slot in the rotor into which the magnet carrier assembly 229 is to be inserted. The rotor slot 64 defines an alignment axis 221 for removal/installation purposes.

The insertion procedure is begun by placing the permanent magnet in the magnet carrier, forming a magnet carrier assembly as set forth herein. Thereafter, the magnet carrier assembly is placed within a keeper box 225 shown with respect to FIG. 22 which is located remote from the motor. The keeper box is characterized by a cover 226 and base 228 which enclose the magnet carrier assembly within the keeper box for transport purposes, but are removed once in position in the installation/removal apparatus. In FIG. 21, the keeper box is not shown around magnet carrier assembly 229.

The attraction strength of a permanent magnet to another permanent magnet or to a ferromagnetic object falls off rapidly with increasing distance from the magnet. As a magnet gets very close to a large iron object, the force becomes very strong. Generally, the attractive force of the magnet is still very weak at a distance on the order of the dimension of the magnet. Therefore, the keeper box 225 in which the magnet is brought into the work area has dimensions that are the order of the magnet and are thick enough to preclude the generation of a strong attractive force. The keeper box may also include a ferromagnetic path closed within itself, in which case, the magnetic forces outside the box are very weak. In any event, the magnet box comprises a means whereby the keeper may be safely handled as long as it is in the box.

The preferred keeper box 225 has a ferromagnetic element in it to return the flux around the magnet. In this embodiment of the keeper box, the magnet is naturally retained within the box by it's own ferromagnetic attraction to the walls of the box and requires positive force to drive the magnet from the box. In an alternative embodiment without a ferromagnetic element, only physical separation prevents the magnet form coming into close proximity to ferromagnetic objects or another magnet. There is no natural tendency for the forces due to the magnetic fields to keep the magnet assembly within keeper box. In this case, it is necessary to incorporate a mechanical fixture, for example a slide and lock, across the bottom of the keeper box to prevent the magnet from falling or being drawn out of the keeper box by external ferromagnetic forces prior to the attachment of the pushrod 190.

The keeper box is located in registration with the motor inspection port over a central opening 227 in the bottom plate 174. Pins or other alignment fixtures not shown in the Figures align the keeper box with the insertion fixture. Clamps 230, 232 engage box tabs 234, 236 to hold the keeper box in place. The keeper box cover and base are removed, and the pushrod 190 is placed in registration with the magnet carrier assembly. Bolts 240, 242 extend through the pushrod and are received in the corresponding threaded bores 243, 243 in the magnet carrier assembly 107 in the preferred embodiment. Thereafter, the ball screw mechanism 184 is attached by means of the clevis and pin 192 or an equivalent combination to the pushrod-magnet carrier assembly.

The pushrod-magnet carrier assembly is inserted, lowered into the motor so that the tab on the magnet carrier assembly is engaged in the corresponding slot or groove 202 in the rotor 204, with the last little adjustment to bring it into final position being done by hand. The ball screw mechanism 184 is disconnected by removing the clevis pin 192 and, the pushrod 190 is detached by removing the bolts 240, 242 which had attached it to the magnet carrier assembly 107. The keeper box 225 is thereafter removed. The keeper box is unclamped and removed from the work area and the bolts which finally secure the magnet carrier assembly to the rotor rim are inserted and screwed into place. The magnet carrier removal procedure is essentially the reverse of that described above. The installation/removal assembly can be rotated to access magnet carrier assemblies on the opposed surface of the rotor.

In some embodiments, the installation/removal apparatus has a tongue which extends into the air gap of the motor, preventing the magnet when it is passing through this area from diverting form it's intended course and moving towards the ferromagnetic stator. A tubular member 244, shown in phantom in FIG. 21, extending form the insertion/removal apparatus 172 below the bottom plate 174 guides the magnet carrier assembly to move in exactly the intended direction as it spans the distance that it must travel from the outside of the motor case to the point where the key on the magnet carrier assembly begins to engage the keyway on the rotor.

Although the invention has been shown and described with respect to a preferred embodiment thereof, it should be understood by those skilled in the art that various other changes, omissions and additions thereto may be made therein without departing from the spirit and scope of the present invention. For example, an installation/removal apparatus similar to the axial field disc embodiment may be readily configured for use with drum rotor machines of the present type.

The invention claimed is:

1. In an electric machine, a method of installation of a magnet carrier means containing a high-energy-product permanent magnet , the electric machine including a rotor; an access port for providing access to the rotor; a stator means cooperating with and adjacent to the rotor; a means for supporting the rotor and the stator for relative rotation therebetween; and an attachment means for releasably positioning the magnet carrier means on the rotor at a one of a plurality of rotor poles wherein the magnet carrier means and the attachment means provide a magnetic flux path between a magnet received in the magnet carrier means and the rotor when the magnet carrier means is positioned on the rotor; the method comprising the steps of:

positioning said magnet carrier means in registration with said access port;

constraining said magnet carrier means to movement only along an installation/removal axis; and providing force to said magnet carrier means to effect movement only at a predetermined magnitude and direction along said installation/removal axis.

2. The method of claim 1 further comprising the step of placing said magnet carrier assembly in a keeper box to maintain a minimum separation of said magnet and an external ferromagnetic object.

3. The method of claim 3 further comprising the step of engaging said attachment means to said rotor, thereby completing installation of said magnet carrier assembly from said rotor.

4. The method of claim 2 further comprising the step of disengaging said attachment means from said rotor, thereby initiating removal of said magnet carrier assembly from said rotor.

* * * * *

UNITED STATES PATENT AND TRADEMARK OFFICE
CERTIFICATE OF CORRECTION

PATENT NO. : 5,831,365
DATED : November 3, 1998
INVENTOR(S) : Thomas A. Keim, Peter P. Mongeau, Thomas Dade It is certified that error appears in the above-identified patent and that said Letters Patent is hereby corrected as shown below:

In claim 3, after "method of claim", please change the "3" to --2--.

Signed and Sealed this

Second Day of March, 1999

Attest:

Q. TODD DICKINSON

*Attesting Officer*     *Acting Commissioner of Patents and Trademarks*